US011368826B2

(12) United States Patent
Bandi et al.

(10) Patent No.: US 11,368,826 B2
(45) Date of Patent: *Jun. 21, 2022

(54) METHOD AND APPARATUS FOR BRIDGING AND OPTIMIZING V2X NETWORKS IN VEHICLES

(71) Applicant: FORD GLOBAL TECHNOLOGIES, LLC, Dearborn, MI (US)

(72) Inventors: Krishna Bandi, Farmington Hills, MI (US); Samer Ibrahim, Dearborn, MI (US); Jovan Milivoje Zagajac, Ann Arbor, MI (US); Sushanta Das, Canton, MI (US); Brennan Hamilton, Birmingham, MI (US); Ivan Vukovic, Birmingham, MI (US); Thomas E. Apczynski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,423

(22) Filed: Jan. 27, 2020

(65) Prior Publication Data
US 2021/0235240 A1 Jul. 29, 2021

(51) Int. Cl.
H04W 4/40 (2018.01)
H04W 4/02 (2018.01)
(Continued)

(52) U.S. Cl.
CPC ............. H04W 4/40 (2018.02); H04L 51/26 (2013.01); H04W 4/027 (2013.01); H04W 4/12 (2013.01); H04W 4/80 (2018.02); H04W 24/08 (2013.01)

(58) Field of Classification Search
CPC ....... H04W 4/027; H04W 4/029; H04W 4/12; H04W 4/40; H04W 4/42; H04W 4/44;
(Continued)

(56) References Cited

U.S. PATENT DOCUMENTS 9,439,121 B2   9/2016   Barreto De Miranda Sargento et al.
9,672,734 B1 *  6/2017   Ratnasingam ....... G08G 1/0968
(Continued)

FOREIGN PATENT DOCUMENTS

WO    2017052488 A1    3/2017

Primary Examiner — Jean A Gelin
(74) Attorney, Agent, or Firm — Michael J. Spenner; Brooks Kushman P.C.

(57) ABSTRACT

An on-board unit of a vehicle includes first and second transceivers. A processor of the vehicle monitors transmissions received from the first and second transceivers, receives an incoming message sent to the processor from the first transceiver, the incoming message being designated for distribution to roadway participants, identifies based on the monitored transmissions whether the second transceiver is in communication with devices of roadway participants available to receive outgoing messages, and if so, construct an outgoing message based on the incoming message and send the outgoing message via the second transceiver, and monitors vehicle network bus traffic to identify a current speed of the vehicle, and responsive to the vehicle moving at least a threshold speed, construct and send vehicle-information outgoing messages including roadway observations of the vehicle, using the first transceiver and the second transceiver, the vehicle-information outgoing messages being designated for distribution to the roadway participants.

19 Claims, 11 Drawing Sheets

(51) Int. Cl.
  *H04L 51/226* (2022.01)
  *H04W 24/08* (2009.01)
  *H04W 4/12* (2009.01)
  *H04W 4/80* (2018.01)

(58) Field of Classification Search
  CPC .......... H04W 4/46; H04W 4/48; H04W 4/80; H04W 24/08; H04W 92/02; H04W 92/04; H04W 92/16; G08G 1/0112; G08G 1/0141
  See application file for complete search history.

(56) References Cited

U.S. PATENT DOCUMENTS

| | | | |
|---|---|---|---|
| 9,786,178 B1* | 10/2017 | Bai | B60Q 5/006 |
| 10,231,187 B1* | 3/2019 | Rubin | H04W 4/46 |
| 2015/0091740 A1* | 4/2015 | Bai | B60Q 9/008 |
| | | | 340/901 |
| 2016/0295624 A1* | 10/2016 | Novlan | H04W 72/04 |
| 2017/0134080 A1* | 5/2017 | Rahman | H04B 7/0456 |
| 2017/0369062 A1* | 12/2017 | Saigusa | B60W 30/16 |
| 2019/0279508 A1* | 9/2019 | Wang | G01S 19/42 |
| 2020/0037131 A1* | 1/2020 | Hieu Nguyen | H04B 7/0617 |
| 2020/0077237 A1* | 3/2020 | Upadhya | G08G 1/07 |
| 2020/0096597 A1* | 3/2020 | Kobayashi | G05D 1/0088 |
| 2020/0120458 A1* | 4/2020 | Aldana | H04W 36/08 |
| 2020/0137580 A1* | 4/2020 | Yang | H04W 12/06 |
| 2020/0193811 A1* | 6/2020 | Zagajac | H04W 4/46 |
| 2020/0207343 A1* | 7/2020 | Vassilovski | G05D 1/0088 |
| 2020/0229206 A1* | 7/2020 | Badic | H04W 40/24 |
| 2020/0282981 A1* | 9/2020 | Wang | H04W 4/40 |
| 2020/0342760 A1* | 10/2020 | Vassilovski | G05D 1/0221 |
| 2020/0382922 A1* | 12/2020 | Park | H04L 69/22 |

\* cited by examiner

METHOD AND APPARATUS FOR BRIDGING AND OPTIMIZING V2X NETWORKS IN VEHICLES

TECHNICAL FIELD

Aspects of the disclosure generally relate to bridging and optimizing vehicle-to-everything (V2X) networks in vehicles.

BACKGROUND

On-board units, or OBUs, provide wireless communications from vehicles to everything. Such communication may be referred to as V2X communication, and includes communication to entities such as roadside units, pedestrians, and other vehicles. V2X communication technologies may include Cellular Vehicle-to-Everything (CV2X) and Dedicated Short Range Communications (DSRC) technologies as some examples.

SUMMARY

In one or more illustrative examples, an on-board unit of a vehicle includes a first transceiver configured to communicate using a first vehicle-to-everything protocol. The on-board unit of the vehicle further includes a second transceiver configured to communicate using a second vehicle-to-everything protocol, the first vehicle-to-everything protocol and the second vehicle-to-everything protocol being incompatible with one another. The on-board unit of the vehicle further includes a processor programmed to monitor transmissions received from the first and second transceivers, receive an incoming message sent to the processor from the first transceiver, the incoming message being designated for distribution to roadway participants, identify based on the monitored transmissions whether the second transceiver is in communication with devices of roadway participants available to receive outgoing messages, and if so, construct an outgoing message based on the incoming message and send the outgoing message via the second transceiver, and monitor vehicle network bus traffic to identify a current speed of the vehicle, and responsive to the vehicle moving at least a threshold speed, construct and send vehicle-information outgoing messages including roadway observations of the vehicle using the first transceiver and the second transceiver, the vehicle-information outgoing messages being designated for distribution to the roadway participants.

In one or more illustrative examples, a method for a vehicle including an on-board unit having a bridge includes monitoring in-vehicle bus traffic to identify a current speed of the vehicle; monitoring wireless message traffic external to the vehicle on a plurality of vehicle communication protocols using a plurality of transceivers; responsive to the current speed being at least a threshold speed, constructing and sending vehicle-information outgoing messages including roadway observations of the vehicle, the sending using a first protocol of the plurality of vehicle communication protocols and a second protocol of the plurality of vehicle communication protocols, the vehicle-information outgoing messages being designated for distribution to roadway participants; and regardless of the current speed, receiving incoming messages from roadway users on a first of the plurality of vehicle communication protocols and interworking and sending outgoing messages to the roadway users on a second of the plurality of vehicle communication protocols.

In one or more illustrative examples, a non-transitory computer readable medium comprising instructions that, when executed by a processor of an on-board unit, cause the on-board unit to monitor in-vehicle bus traffic to identify a current speed of the vehicle; monitor wireless message traffic external to the vehicle on a plurality of vehicle communication protocols using a plurality of transceivers; responsive to the current speed being at least a threshold speed, construct and send vehicle-information outgoing messages including roadway observations of the vehicle, the send using a first protocol of the plurality of vehicle communication protocols and a second protocol of the plurality of vehicle communication protocols, the vehicle-information outgoing messages being designated for distribution to roadway participants; and regardless of the current speed, receive incoming messages from roadway users on a first of the plurality of vehicle communication protocols and interwork and send outgoing messages to the roadway users on a second of the plurality of vehicle communication protocols.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle-to-everything (V2X) communication includes various types of communications, including vehicle-to-vehicle (V2V), vehicle-to-infrastructure (V2I), vehicle-to-person (V2P), and vehicle-to-network (V2N). These multi-faceted communication aspects may be delivered by a wide range of wireless communication technologies, such as: Wi-Fi, Bluetooth, DSRC, CV2X (e.g., PC5, although other options are contemplated), LTE, Ultra-Wide Band, and Long Range (Low Power) Communication. If these standalone distinct technologies could leverage input from each other and act in interoperable manner, it would benefit intelligent transportation system (ITS) applications. For example, if a pedestrian's BLUETOOTH-enabled smartphone could communicate with the roadway users (e.g., vehicles, pedestrians, etc.), then that communication may be used to enhance the routing of vehicles along the roadway.

However, wireless technologies in most cases are not designed to be interoperable. For instance, CV2X and DSRC use the ITS (Intelligent Transportation Systems) protocols, WAVE (Wireless Access in Vehicular Environments) uses various different standards provided by the IEEE, 3GPP, and SAE; Bluetooth uses the Bluetooth SIG (Special Interest Group) Standards. LoRa uses the LoRaWAN (Long Range Low Power Wide Area Networks) standards; and UWB uses the Ultra-Wide Band Standards. Directly addressing the interoperability of wireless standards for ITS applications is not feasible.

In this disclosure, an efficient method and apparatus by a vehicle to Bridge ITS networks supported by distinct wireless technologies is described, which may be used to leverage input from various protocols and technologies to enhance ITS applications.

Figure 1:
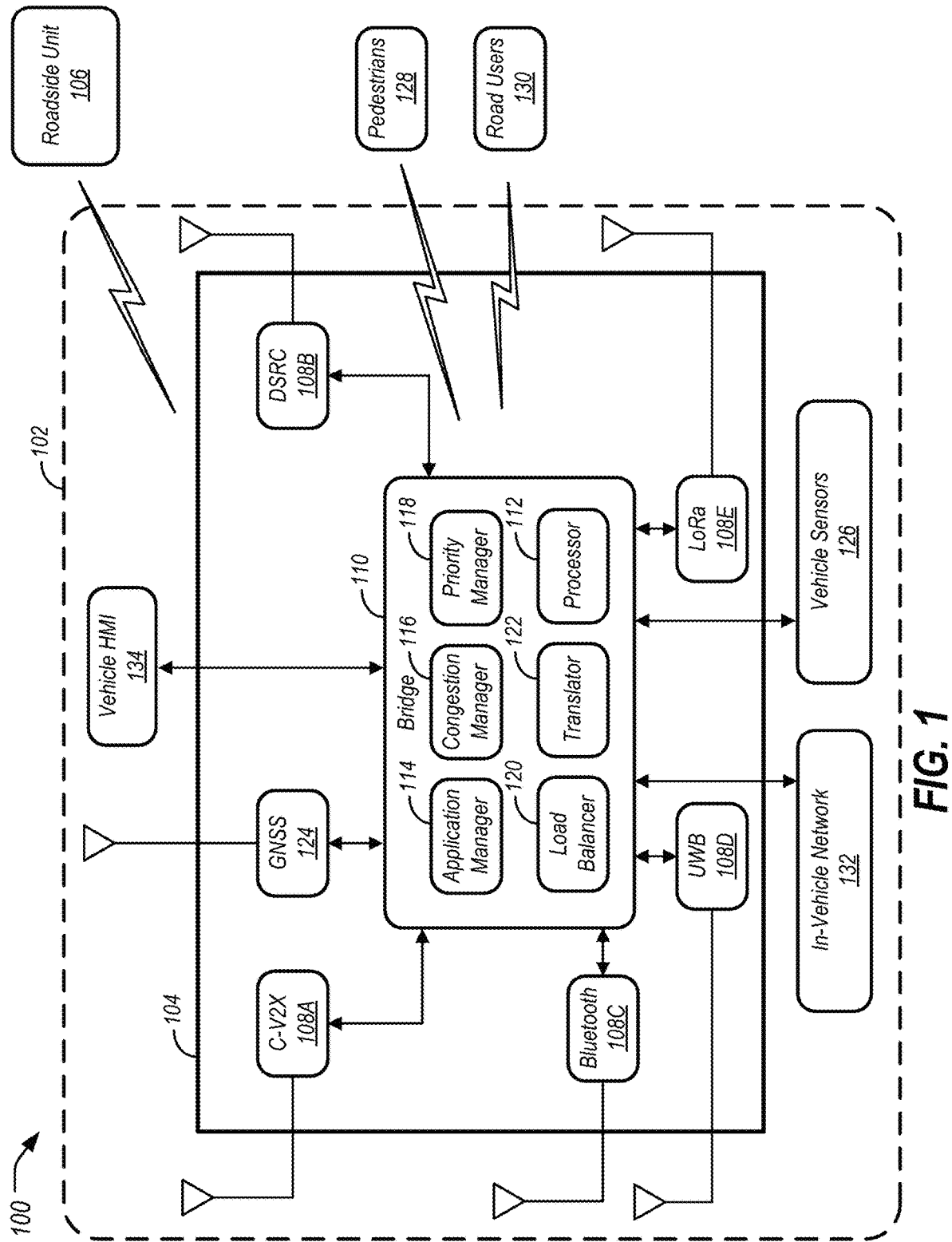
FIG. 1 illustrates a system including an OBU with an embedded bridge.

FIG. 1 illustrates a system 100 including an On-Board Unit (OBU) 104 with an embedded bridge 110. The OBU 104 is generally a transceiver that may be mounted in a vehicle 102. When in operation, the OBU 104 broadcasts data or exchanges data with vehicles, other roadway users 130, or other networked devices such as roadside units (RSUs) 106 within a communications zone surrounding the OBU 104. The bridge 110 of the OBU 104 may accordingly aid in interoperability between the respective technologies of the pedestrians 128, other roadway users 130, and RSUs 106. The OBU 104 may also provide for channel assignment and operating instructions to devices within the communications zone.

As shown the OBU 104 includes a plurality of radio transceivers 108. These radio transceivers 108 may include physical radio units and/or software-defined radio units. In the illustrated example, the OBU 104 includes a C-V2X radio transceiver 108A (e.g., PC5), a DSRC radio transceiver 108B, a BLUETOOTH radio transceiver 108C, an ultra-wide band (UWB) radio transceiver 108D, and a long-range low-power radio (LoRa) transceiver 108E. It should be noted that the illustrated radio transceivers 108 of the OBU 104 are only an example, and more, fewer, or different radios (e.g., Wi-Fi) may be included in the OBU 104. It should also be noted that in some examples, multiple technologies may be supported by a single radio transceiver 108, such as both Wi-Fi and DSRC may be implemented using a single radio transceiver 108, and/or cellular and V2X may be implemented using a single radio transceiver 108.

The bridge 110 may be configured to provide for simultaneous radio frequency (RF) transmission and reception of messages in multiple wireless technologies via the radio transceivers 108. The bridge 110 may include various types of computing apparatus in support of performance of the functions of the bridge 110 described herein. In an example, the bridge 110 may include one or more processors 112 configured to execute computer instructions of various components, such as of an application manager 114, a congestion manager 116, a priority manager 118, a load balancer 120, and a translator 122. In some cases, the processor 112 may be referred to as an edge computer, as the processor 112 may perform computations for devices at the edge of the network. The bridge 110 may further include a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor 112 receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The application manager 114 be programmed to classify roadway participants utilizing applications installed to their mobile devices (e.g., bicycles, pedestrians, scooters, etc.), determine threat levels of the classified participants (e.g., how important it is to inform other roadway participants of the classified participant), and assign priorities to the participants according to the threat levels. The priorities may be used to determine what messages should be provided to the roadway participants. The application manager 114 may be programmed to allow the bridge 110 to interface with information received from mobile devices of pedestrians 128. In an example, the application manager 114 may receive information such as pedestrian 128 location and/or whether a pedestrian 128 is handicap from one or more pedestrians at that respective intersections. The application manager 114 may further utilize this location information of the multiple pedestrians to determine if any/all of those pedestrians 128 may be a threat to any other traffic participants that may be reached via the radio transceivers 108 of the OBU 104. Based on the target classification, the application manager 114 may determine a threat level. The application manager 114 may also assign a priority and provides necessary information to other components of the OBU 104 to construct outgoing messages for the respective wireless networks for use by other traffic participants. For instance, if a pedestrian is identified as from a message sent by a mobile device of the pedestrian as being close to the roadway, then a message indicating the location of that pedestrian may be immediately broadcast using the transceivers 108. However, if the pedestrian is identified by the message as not being close to the roadway, then a message indicating the location of that pedestrian may be sent later or after other messages that are of higher priority.

The congestion manager 116 may be programmed to identify congestion scenarios on each of the wireless networks that the bridge 110 can access via the radio transceivers 108. The congestion manager 116 may also be programmed to perform operations to mitigate congestion at the radio transceiver 108 level for efficient communication between the different wireless networks. For instance, the congestion manager 116 may direct a radio transceiver 108 that is congested to perform operations to mitigate the congestion. These operations may include, for example, to adjust the channels being used, to change the frequency being used, to adjust the transmit power for outgoing message, to adjust the probability in determining the necessary message frequency rate for outgoing messages.

The priority manager 118 may be programmed to manage priority of messages that are processed by the bridge 110. In an example, some messages being processed by the bridge 110 may be more important to report that others. For instance, if fifty pedestrians 128 are waiting to cross a road, then the priority manager 118 may send out a single message indicating that fifty pedestrians 128 are waiting (or in other cases choose one message from one pedestrian 128 to process) based on the priority level received by the priority manager 118 from the application manager 114. In another example, the priority manager 118 may be programmed to receive C-V2X messages that occur at one tenth of a second intervals, but only process those messages that include new priority information compared to the previous message such that the outgoing messages are being prioritized correctly.

The load balancer 120 may be programmed to manage load across the different networks that the bridge 110 can access using the radio transceivers 108. For example, if Wi-Fi is congested, then the load balancer 120 may be programmed to optimize to send messages over a different radio transceiver 108, provided that the intended recipients can receive using that different radio transceiver 108. In some examples, the bridge 110 may query roadway users 130 or other message recipients to determine what communications protocols are supported by the devices. Additionally, or alternately, the bridge 110 may maintain a mapping of default protocols supported by various categories of device, e.g., that DSRC and C-V2X are supported by roadway users 130, that BLUETOOTH and Wi-Fi are supported by mobile phones, and so on. As another possibility, devices that connect to the OBU 104 may be configured to select one of the transceivers 108 to use based on desired Key-Performance Indicators (KPI). For example, the same information may be encoded and transmitted via BLUETOOTH, WiFi, Cellular, LoRa or other wireless interfaces. While each protocol has its own merits and demerits, the connecting device may be configured to choose, in instances where the device is configured to communicate with multiple transceivers 108 of the OBU 104, to select the transceiver 108 to use in terms of desired Quality of Service (e.g., latency, data rate requirement etc. based on available networks and balancing the network load, etc.).

The translator 122 may be programmed to perform translation of messages from one protocol to another. This may be done to allow messages to and from the different distinct wireless technologies supported by the transceivers 108 to be translated such that the translated information for the different distinct wireless technologies allows the devices connected to different transceivers 108 of the OBU 104 to be interoperable. In an example, the translator 122 may allow a message to be received from a sender using one of the radio transceivers 108 (e.g., CV2X), and be translated along to a recipient using a different one of the radio transceivers 108 (e.g., via DSRC). The translator 122 may take into consideration translating of messages between the wireless networks at the network layer level, as per the open system interconnection model, or OSI model.

Notably, due to differences in the protocols supported by the different radio transceivers 108, the translator 122 may be required to more than simply translate a message in a first protocol to a message in a second protocol. For instance, in some cases a protocol may include simple ping messages from a device, while, in another protocol, more detailed messages with current location and other information may be required. Accordingly, in such cases the translator 122 may create packets that include additional information in conformance with the requirements of the protocol being translated to.

The global navigation satellite system (GNSS) 124 controller may be configured to allow the OBU 104 to determine information indicative of the location of the OBU 104. In an example, the GNSS 124 may utilize one or more of GPS, GLONASS, Galileo or BeiDou systems to provide a fix in location for the OBU 104.

The vehicle sensors 126 may include cameras or other technologies configured to sense roadway users 130, pedestrians 128, roadside objects, or other obstacles that lack in wireless connectivity. In an example, the vehicle sensors 126 may include a camera or cameras that provide still images or video that may be analyzed using image recognition algorithms to identify the roadway users 130, pedestrians 128, roadside objects, or other obstacles. The vehicle sensors 126 may accordingly be used to provide information about non-wireless-enabled participants in the roadway that may be useful for the bridge 110 in understanding their locations. For instance, the vehicle sensors 126 may sense a pedestrian 128 or a roadway user 130 and may operate as a stand-in for the pedestrian 128 or roadway user 130 in determining whether it is appropriate for a wireless-enabled participant to traverse the roadway, or simply to advise the wireless-enabled participant of the existence of the non-wireless-enabled participant.

The OBU 104 may be further configured to communicate with other components of the vehicle 102 via one or more in-vehicle networks 132. The in-vehicle networks 132 may include one or more of a vehicle controller area network (CAN), an Ethernet network, and a media-oriented system transfer (MOST), as some examples. The in-vehicle networks 132 may allow the OBU 104 to communicate with other vehicle 102 systems, such as various vehicle electronic control units (ECUs). As some non-limiting possibilities, the vehicle ECUs may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

The OBU 104 may be further configured to communicate with a vehicle human-machine interface (HMI) 134. The vehicle HMI 134 may include one or more displays, such as a gauge cluster, a center stack screen or other controls, a heads-up display, and/or one or more vehicle lights. The vehicle HMI 134 may additionally or alternately include speakers, buzzers, haptic elements, or other devices that may be used to provide indications to vehicle 102 occupants. The vehicle HMI 134 may also include devices configured to receive input from vehicle 102 occupants, such as buttons, touch-sensitive screens or other controls, microphones to receive voice input, cameras to receive gesture input, and the like.

The OBU 104 may be configured to monitor the mobility, congestion patterns, and network load on each radio interface in the background, receive messages as input over one or more technologies, and process each of the received messages in order to classify the target devices by location and priority level. This classification of the devices includes analyzing the information received via the transceivers 108 over the different wireless networks from the different devices, performing a threat analysis on the received messages, determining the threat levels between the respective targets of the respective wireless technologies, and providing the classification information for the outgoing message to avoid any incidents or to help in providing the information for efficient management of the network load.

Based on the classification, priority level, and monitoring status from each of the interfaces, the OBU 104 may determine which output interface the messages or a subset of the message will be transmitted on. Accordingly, the OBU 104 may, for each of the selected output interfaces for transmission, translate the message or the message subset to the appropriate format for this particular output interface.

Figure 2:
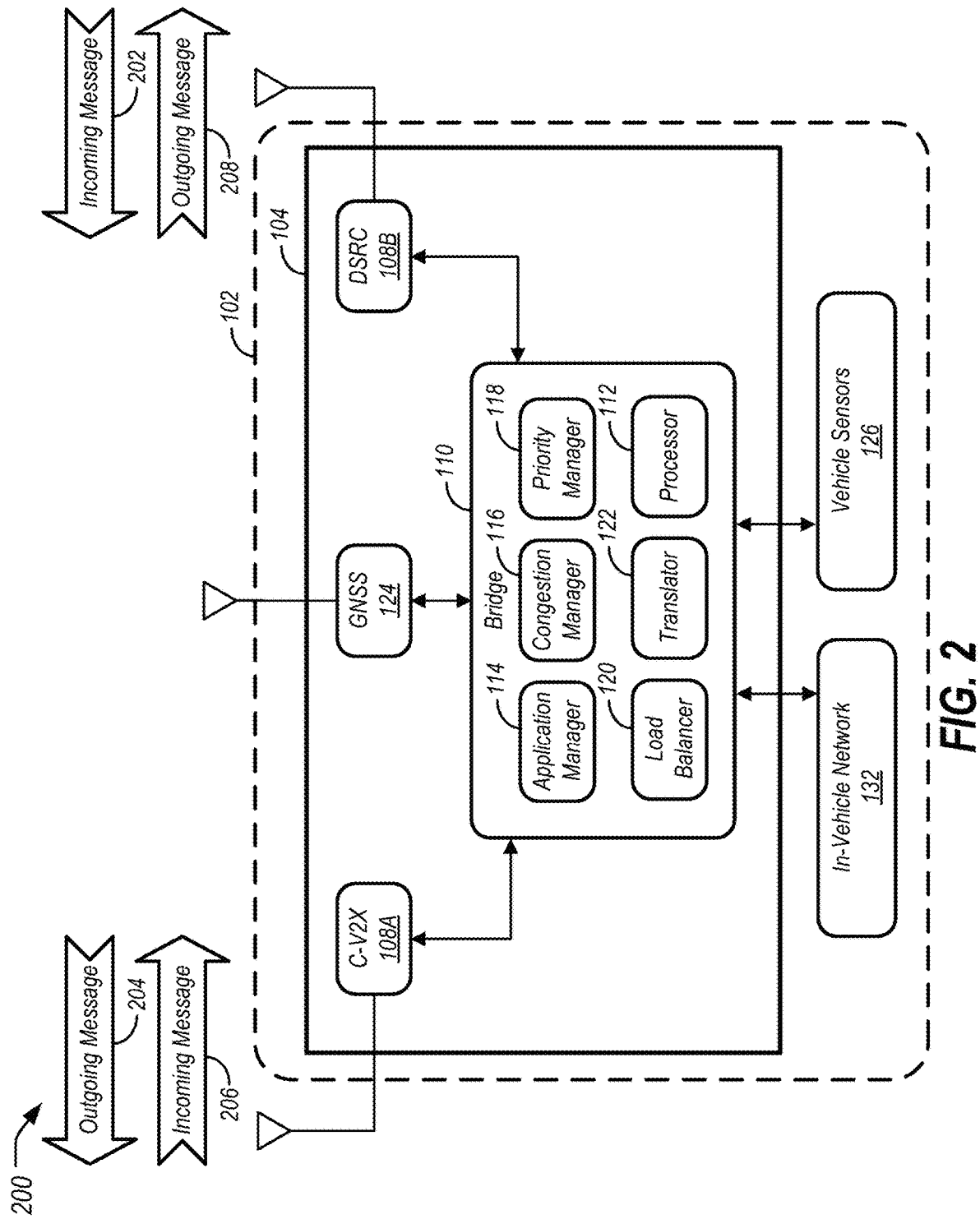
FIG. 2 illustrates an example of the OBU bridging two radio interfaces.

FIG. 2 illustrates an example 200 of the OBU 104 bridging two radio interfaces. For example, the radio interfaces may include a C-V2X radio 108A (e.g., PC5) and a DSRC radio 108B. An incoming message 202 may be received by the bridge 110 of the OBU 104 over one input radio interface, (e.g., the DSRC radio 108B) as shown in the example 200. Responsive to receipt of the incoming message 202, the bridge 110 of the OBU 104 may send an output message 204. It should be noted that the bridge 110 may communicate using unicast, multi-cast, and/or broadcast communication modes.

As discussed above, the bridge 110 monitors the mobility, congestion pattern status and network load on both DSRC and C-V2X (PC5) radio 108 interfaces. Responsive to receipt of the incoming message 202 to the DSRC radio 108B, the bridge 110 decodes the incoming message 202 to classify the target and the priority levels. According to this classification, the bridge 110 may assign a priority at the CV2X (PC5) radio 108A interface and may translate the V2X message into a format acceptable for CV2X (PC5) communication. The bridge 110 may then transmit the translated message as an outgoing message 204 over C-V2X (PC5) radio 108A interface. A reverse approach may be performed if the message was received on the CV2X (PC5) radio 108A interface to be output via the DSRC radio 108B interface, as shown via the incoming message 206 and the outgoing message 208. Regardless of direction, this approach may generally be applicable to arbitrary pairs of wireless technologies which are utilized by the radios 108 embedded in the bridge 110.

Figure 3:
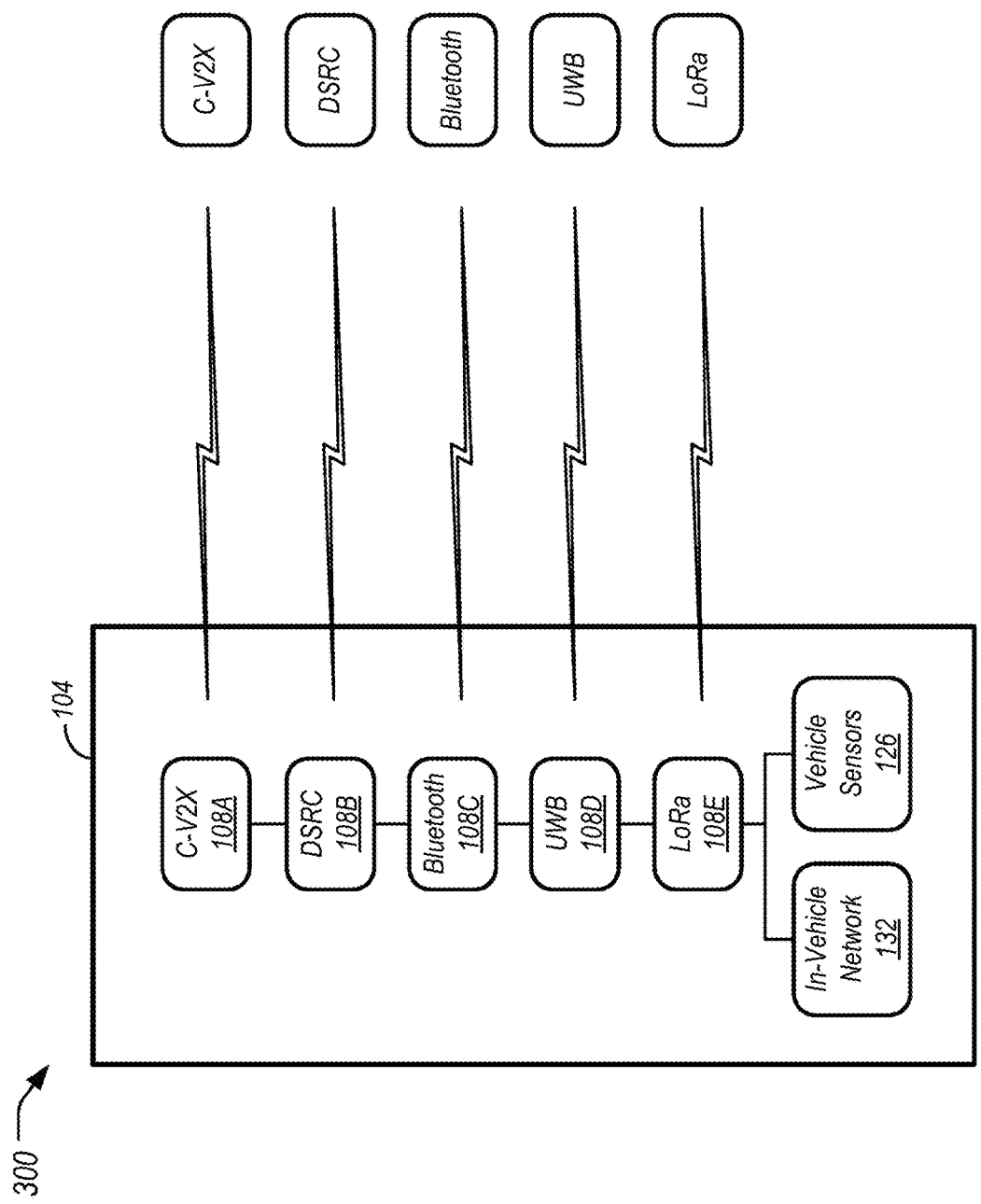
FIG. 3 illustrates an example of the OBU in wireless communication over various radio interfaces.

FIG. 3 illustrates an example 300 of the OBU 104 in wireless communication over various radio transceivers 108. As shown, the OBU 104 is in wireless communication via the C-V2X radio 108A with C-V2X equipped devices, is in wireless communication via the DSRC radio transceiver 108B with DSRC-equipped devices, is in wireless communication via the BLUETOOTH radio transceiver 108C with BLUETOOTH- or BLE-equipped devices, is in wireless communication via the UWB radio transceiver 108D with UWB-equipped devices, and is in wireless communication via the LoRa radio transceiver 108E with LoRa-equipped devices.

Figure 4:
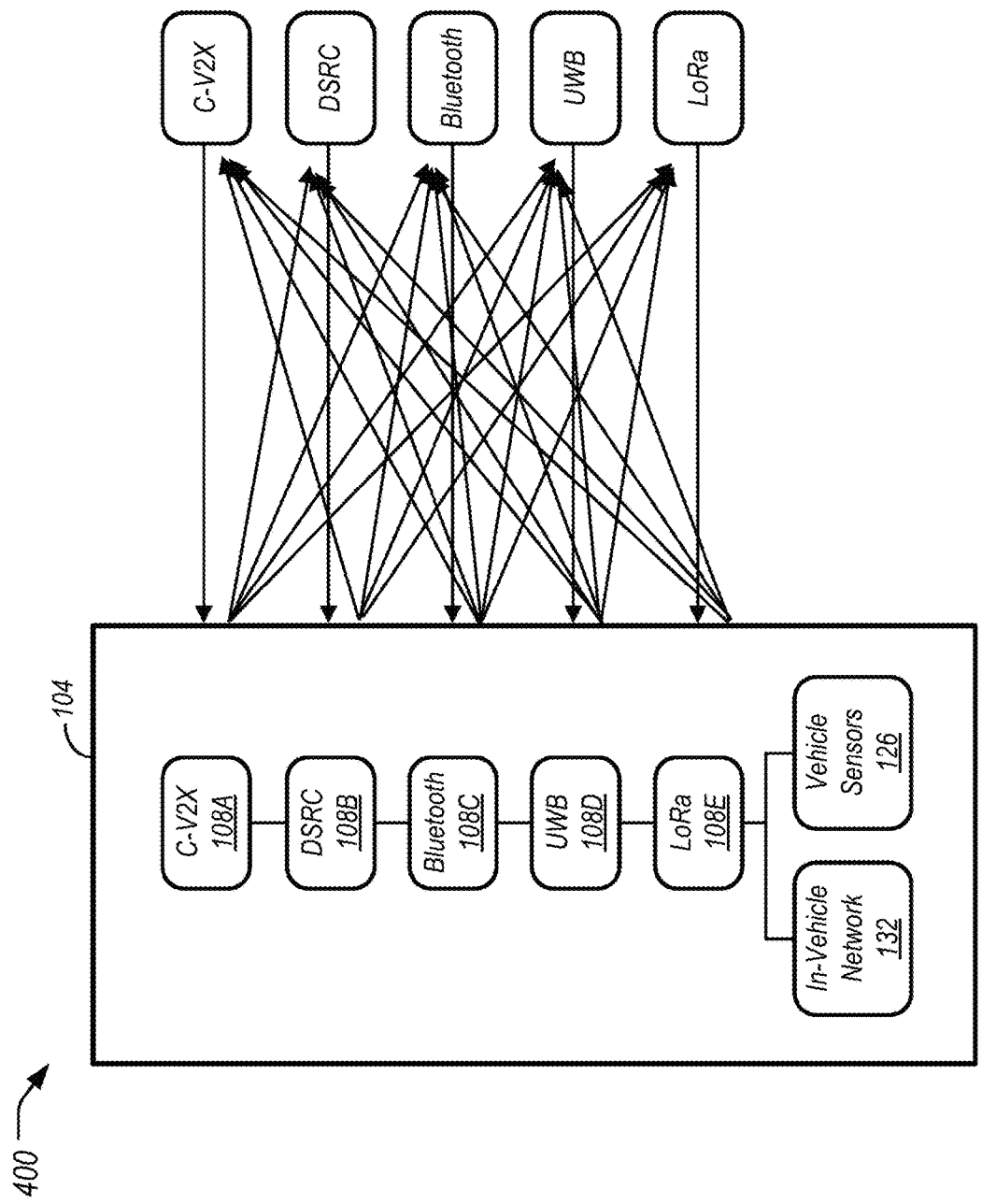
FIG. 4 illustrates an example of possible translation paths among radio interfaces available via the OBU.

FIG. 4 illustrates an example 400 of possible translation paths among radio transceivers 108 available via the OBU 104. As can be seen in the example 400, translation paths exist from each of the C-V2X radio 108A, the DSRC radio 108B, the BLUETOOTH radio 108C, the UWB radio 108D, and the LoRa radio 108E to each of one another. Accordingly, the bridge 110 allows for translation among each of the various supported protocols.

Referring back to FIG. 2, with respect to the background monitoring process, the bridge 110 may keep track of the congestion level on the C-V2X (PC5) radio 108A interface using the congestion manager 116. The translated outgoing message 204 reaching the C-V2X (PC5) radio 108A output interface may be subjected to the congestion control algorithm running by the congestion manager 116 for this interface. The congestion control algorithm monitors channel quality of service parameters and also channel congestion. Based on this monitoring, the congestion control algorithm determines a transmission probability for the translated outgoing message 204 and adjusts the transmit power accordingly on the transmission of the outgoing messages 204 for the various respective wireless technologies.

As another example, the congestion manager 116 monitoring the mobility, congestion patterns, and networks load on C-V2X (PC5) radio 108A may not detect transmissions on that interface or may not detect any transmissions in a particular target classification area where DSRC transmissions are present. If a DSRC message is received on the DSRC radio 108B interface, then the bridge 110, responsive to classification of the message, may decide not to translate and forward this message to the C-V2X (PC5) output radio 108A interface. This may be logical, for example, if the bridge 110 deems there to be no recipients for such a message.

For instance, a first message 202 may be received simultaneously or within a short timeframe on two or more input radio interfaces. As one possibility, an incoming message 202-A is received to the C-V2X radio interface 108A while an incoming message 202-B is also received to the DSRC radio 108B interface. The bridge 110, responsive to performing the message classification, may determine which of the multiple messages 202 is of higher or highest priority, and may send an outgoing message 208 first for the message 202 of higher or highest priority. Subsequently, the bridge 110 may create messages for the other interfaces who were deprioritized.

Figure 5:
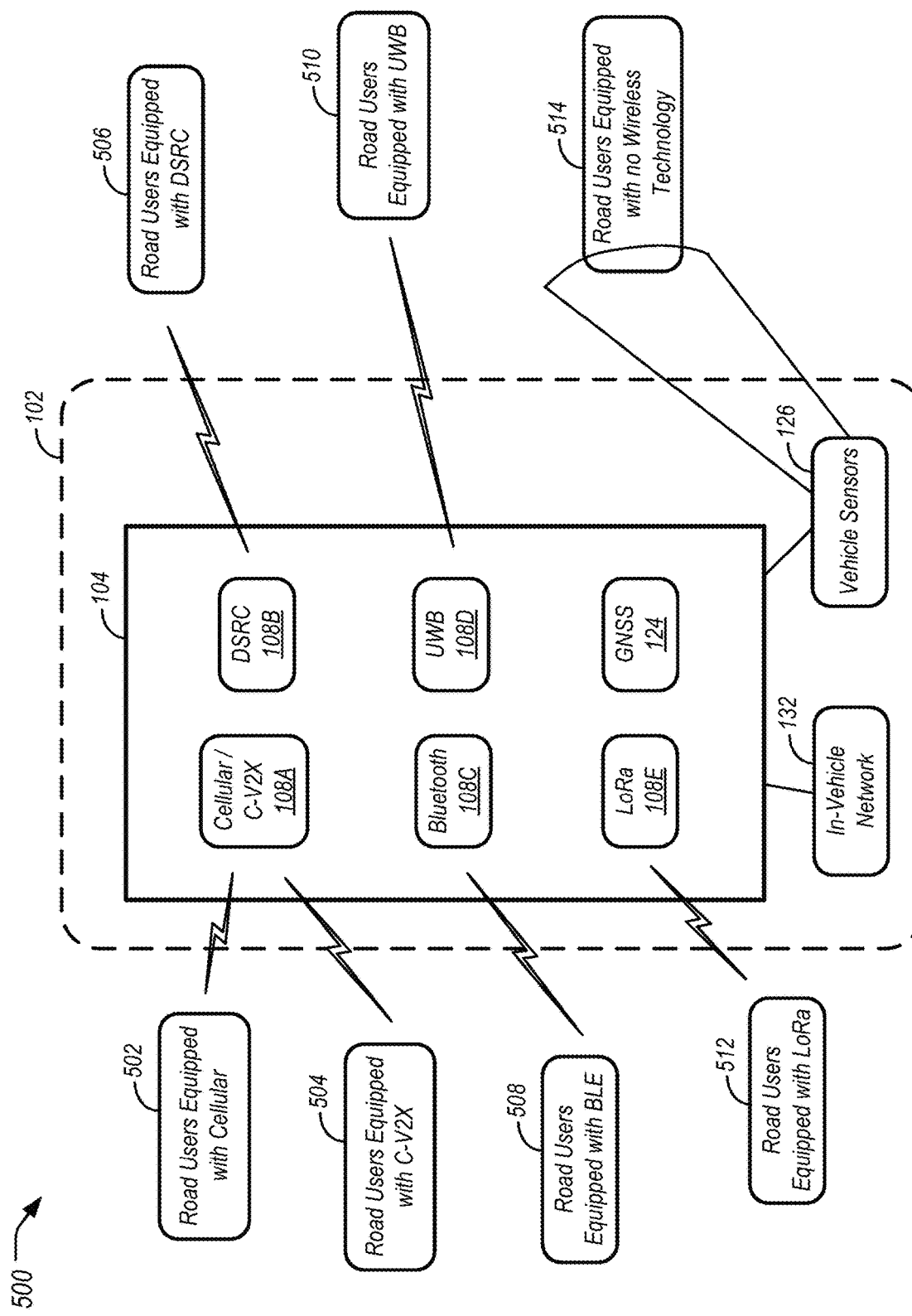
FIG. 5 illustrates an example of the OBU in communication with various devices in the context of a roadway.

FIG. 5 illustrates an example 500 of the OBU 104 of the vehicle 102 in communication with various devices in the context of a roadway. For instance, the C-V2X radio interface 108A may be in communication with roadway users 130 equipped with cellular transceivers as shown at 502 and/or C-V2X transceivers as shown at 504. The DSRC radio interface 108B may be in communication with vehicles 102 or other roadway users 130 equipped with DSRC transceivers as shown at 506. The BLUETOOTH radio interface 108B may be in communication with pedestrians 128 or other roadway users 130 equipped with BLE transceivers as shown at 508. The UWB radio interface 108D may be in communication with UWB-equipped roadway users 130 as shown at 510, such as vehicles 102 or pedestrians 128. The LoRa radio interface 108E may be in communication with scooters equipped with LoRa as shown at 512. The vehicle sensors 126, as mentioned above, may include cameras or other technologies configured to sense roadway users 130 equipped with no wireless technologies as shown at 514, or in other examples with roadway users 130 that are otherwise unable to wirelessly unable to communicate wirelessly with the OBU 104 (e.g., due to damage or interference). The in-vehicle network 132 may also allow the OBU 104 to communicate with the various vehicle 102 ECUs.

Figure 6:
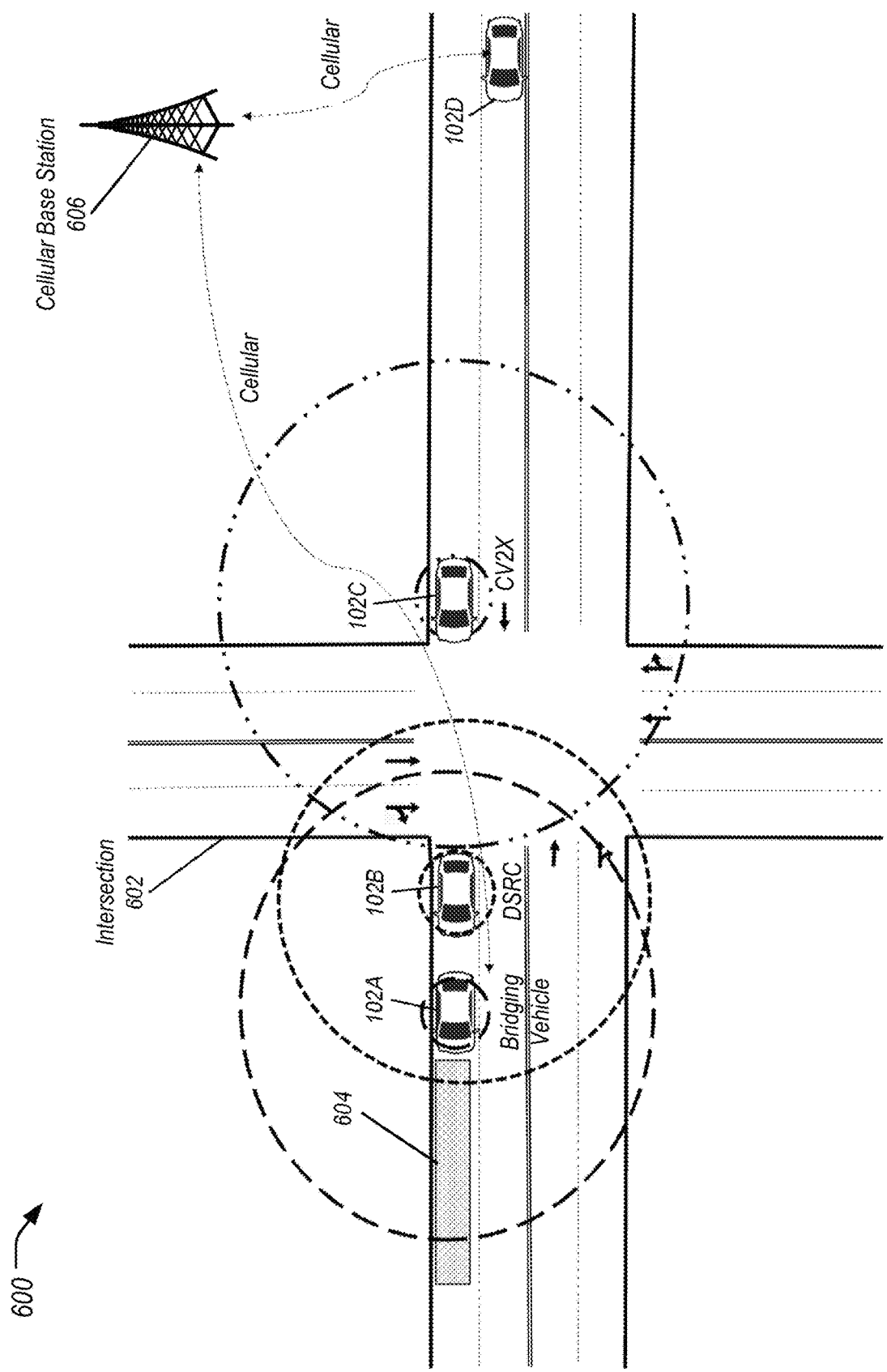
FIG. 6 illustrates an example representation of an obstacle area in proximity to a bridging vehicle using the on-board bridge.

FIG. 6 illustrates an example 600 representation of an obstacle area 604 in proximity to a bridging vehicle 102A using the on-board bridge 110. The bridging vehicle 102A may be, as some possibilities, a first responder vehicle or a construction maintenance vehicle 102. The bridging vehicle 102A may utilize the bridge 110 to facilitate V2V communication between the bridging vehicle 102A and other roadway users 130, e.g., DSRC-equipped-vehicles 102B, CV2X-equipped-vehicles 102C, and/or cellular-equipped vehicles 102D.

As shown, the bridging vehicle 102A identifies an obstacle area 604 (e.g., a construction zone, an accident, adjacency to lawn mowing, snow plow ahead, etc.) in proximity to the intersection 602. The bridging vehicle 102A may utilize the bridge 110 to broadcast presence of the obstacle area 604 (which might be on temporary basis), over the respective wireless technologies. For example, as shown the DSRC-equipped-vehicle 102B is oncoming to the obstacle area 604, and may accordingly receive a transmission from the bridging vehicle 102A indicating presence of the obstacle area 604. As another example, the cellular-equipped vehicles 102D is further away, but also oncoming, and may receive a transmission from the bridging vehicle 102A over cellular (e.g., via a cellular base station 606) indicating presence of the obstacle area 604. The vehicles 102 receiving the transmission may accordingly be made aware of the condition and may adjust its routing.

The bridging vehicle 102A may also be configured to broadcast information about workers or other people or obstacles in the obstacle area 604. This may include, for instance, first responders who may have various wireless technology-equipped devices on their person. In an example, if a construction worker has a BLE-equipped mobile device, a PSM may be sent from that mobile device to the BLE of the bridging vehicle 102A, where the bridging vehicle 102A may then broadcast the PSM of the construction worker over various different wireless technologies so that if an oncoming vehicle 102 is C-V2X/DSRC/cellular-technology equipped, then the vehicle 102 may be made aware ahead to avoid the construction workers.

Figure 7:
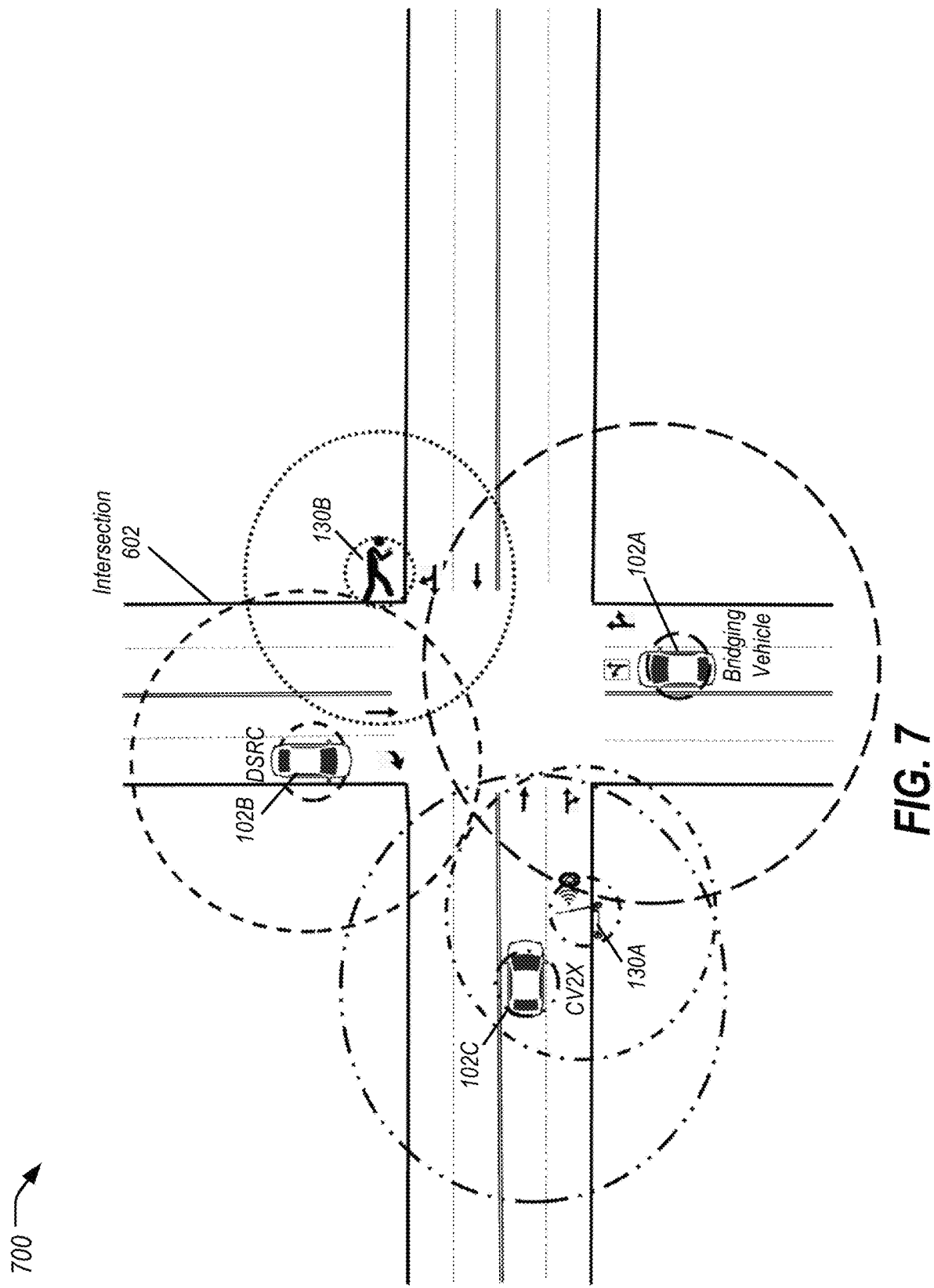
FIG. 7 illustrates an alternate example showing a non-signalized intersection including the bridging vehicle using the on-board bridge.

FIG. 7 illustrates an alternate example 700 of a non-signalized intersection 602 including a bridging vehicle 102A using the on-board bridge 110. Similar to as shown in the example 600, the bridging vehicle 102A may utilize the bridge 110 to facilitate V2V communication between the bridging vehicle 102A and other roadway users 130, e.g., DSRC-equipped-vehicles 102B, CV2X-equipped-vehicles 102C, and/or BLUETOOTH-equipped roadway users 130A and 130B. Notably, as these vehicles 102 and other roadway users 130 utilize disparate communications protocols, they lack capability to communicate directly with one another. Nevertheless, the vehicle 102A using the on-board bridge 110 may approach approaching the intersection 602 and may translate messages 204 and send messages 206 to will make the other vehicles 102 and other roadway users 130 aware of one another's presence. In an example scenario, the bridging vehicle 102A is a first responder vehicle 102A. As the first responder vehicle 102A is equipped with the bridge 110, the vehicle 102A may make others aware of the presence of the first responder vehicle 102A.

Figure 8:
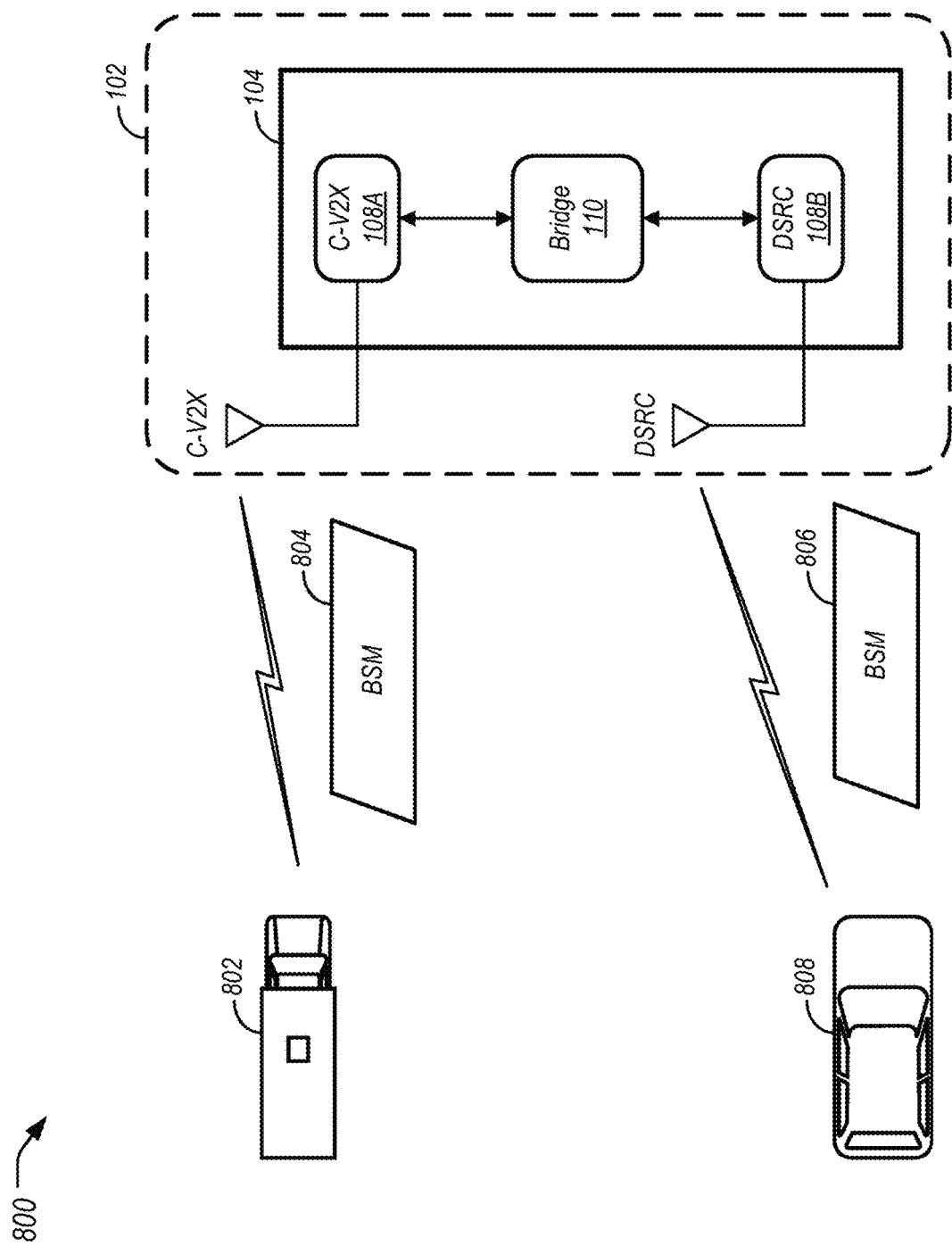
FIG. 8 illustrates an example of vehicle-to-vehicle communication interworking CV2X and DSRC using the OBU.

FIG. 8 illustrates an example 800 of vehicle-to-vehicle (V2V) communication interworking CV2X and DSRC using the OBU 104 of the vehicle 102. Thus, the example 800 illustrates a scenario in terms of V2V communication between CV2X-equipped-vehicles 802 and DSRC-equipped-vehicles 808. Such a scenario may benefit the ITS safety applications in that different V2X technologies are made to be interoperable by way of the functionality of the bridge 110 of the OBU 104.

In general, CV2X and DSRC messaging uses the same ITS standard protocols such as SAE-J2735_201603, IEEE-1609.2, IEEE-1609.3, IEEE-1609.12 for transmission and reception of the messages. These messages are defined in the SAE-J2735_201603 standard protocol. In an example, one of the messages from the SAE-J2735_201603 is a basic safety message (BSM). The BSM may contain a set of core data elements (e.g., vehicle size, position, speed, heading acceleration, brake system status). As shown, a vehicle 802 configured to transmit CV2X is transmitting a BSM 804 via CV2X. The vehicle 802 may transmit such a message approximately ten times per second. Regarding CV2X Protocols, CV2X-PC5 uses LTE-V2X (3GPP Rel) for Physical and MAC Layer, and the CV2X equipped vehicle 802 uses the SAE J3161 for the on-board system requirements.

The BSM 804 may be received by the C-V2X transceiver 108A of the OBU 104 and may be provided to the bridge 110. The bridge 110 uses the processor 112, application manager 114, congestion manager 116, priority manager 118, load balancer 120, translator 122, to translate the BSM 804 into a BSM 806 to be transmitted using the DSRC radio transceiver 108C of the OBU 104. For instance, the OBU 104 may monitor the mobility, the congestion pattern status, and the network load on both DSRC and C-V2X (PC5) interfaces to aid in for decision making. The OBU 104 may decode the CV2X message to classify the target and the priority levels using the processor 112. According to this classification the OBU 104 assigns priority at the CV2X (PC5) interface using the priority manager 118, translates the message into a format acceptable for DSRC communication using the translator 122, and sends the translated message for transmission to the output interface (here DSRC). The congestion manager 116 may also keep track of the congestion level on the output interface to subject output messages to the congestion control algorithm for the output interface. The BSM 806 may accordingly be received by a vehicle 808 configured to receive messages via DSRC. Regarding DSRC protocols, DSRC uses IEEE 802.11p, 1609.4 for Physical and MAC Layer, and the DSRC equipped vehicle 808 uses the SAE J2945/1 for the on-board system requirements.

Figure 9:
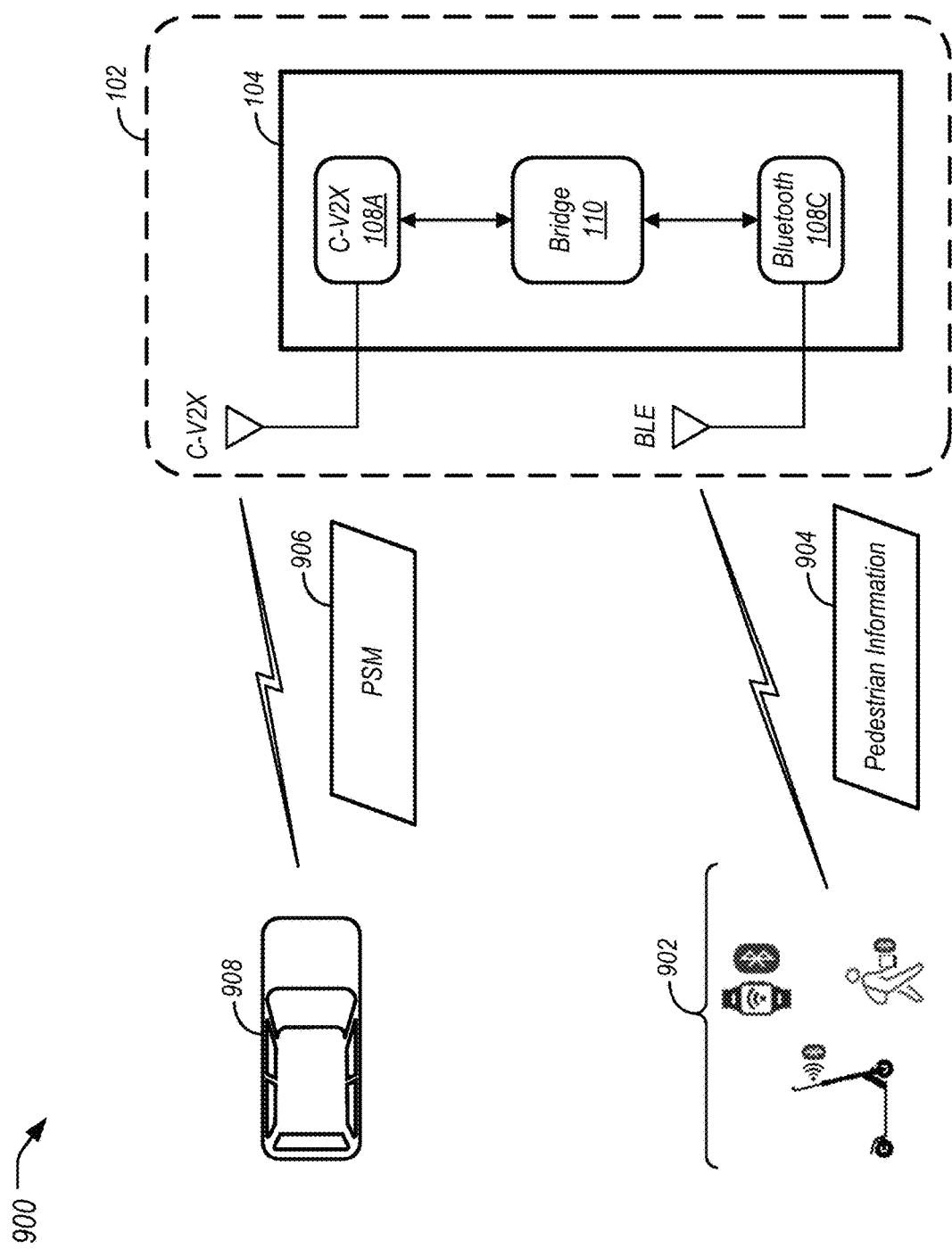
FIG. 9 illustrates an example of vehicle-to-pedestrian communication interworking CV2X and BLE using the OBU.

FIG. 9 illustrates an example of vehicle-to-pedestrian communication interworking CV2X and BLE using the OBU 104. Notably, CV2X and BLE uses different standard protocols. For example, CV2X-PC5 uses LTE-V2X (3GPP Rel) for Physical and MAC Layers, and a CV2X equipped vehicle 908 uses the SAE J3161 for the on-board system requirements and ITS standards for other OSI layers. ITS standards such as SAE-J2735_2016 IEEE-1609.2, IEEE-1609.3, IEEE-1609.12 may be used for the transmission and reception of the messages. Regarding BLE protocols, BLE uses IEEE 802.15.1, and BLE uses Bluetooth SIG Standards for other OSI layers.

As shown, the Bluetooth transceiver of the pedestrian 902 sends pedestrian information 904 using BLE message attributes (such as identifiers, descriptors, characteristics, services, etc.). Notably, this transceiver of the pedestrian 902 may be a transceiver of a mobile device of the pedestrian 902 (e.g., a smartphone, a smart watch, a tablet, etc.) or a transceiver of a mobility device of the pedestrian 902 (e.g., a scooter, a bicycle, etc.). This pedestrian information 904 may be received by the Bluetooth transceiver 108C of the OBU 104 and may be provided from the transceiver 108C to the bridge 110.

The translator 122 of the bridge 110 may translate the pedestrian information 904 of the BLE messages into a CV2X-ITS message. In an example, the information of the BLE message may be translated into a personal safety message (PSM) 906. Details of the PSM 906 format are defined in SAE-J2735_201603. The PSM 906 may be transmitted from the C-V2X transceiver 108A of the OBU 104 to be received by a vehicle 908 equipped with CV2X capabilities. Thus, the vehicle 908 may be able to receive information over CV2X about pedestrians 902 who are not capable of communicating over CV2X.

More generally, the bridge 110 again monitors the mobility, the congestion pattern status, and the network load on the radio interfaces of the OBU 104. The bridge 110 decodes the incoming BLUETOOTH-BLE beacon messages to classify the target and the priority levels, where according to this classification the bridge 110 assigns priority of outgoing messages 204 at the multiple output radio interfaces and translates the beacon message information to the respective message formats acceptable for multiple radio communications selected as output radio interfaces. The bridge 110 then causes the translated beacon message to be transmitted over the output radio interfaces. Additionally, the bridge 110 may monitor to track the congestion level on each of the radio interfaces. The translated message reaching the multiple radio output interfaces may accordingly be subjected to the congestion control algorithm running in those particular output interfaces. Or, if no messaging is detected over a particular protocol (e.g., no DSRC traffic), no output message may be required to be provided by the OBU 104 over that protocol.

Figure 10:
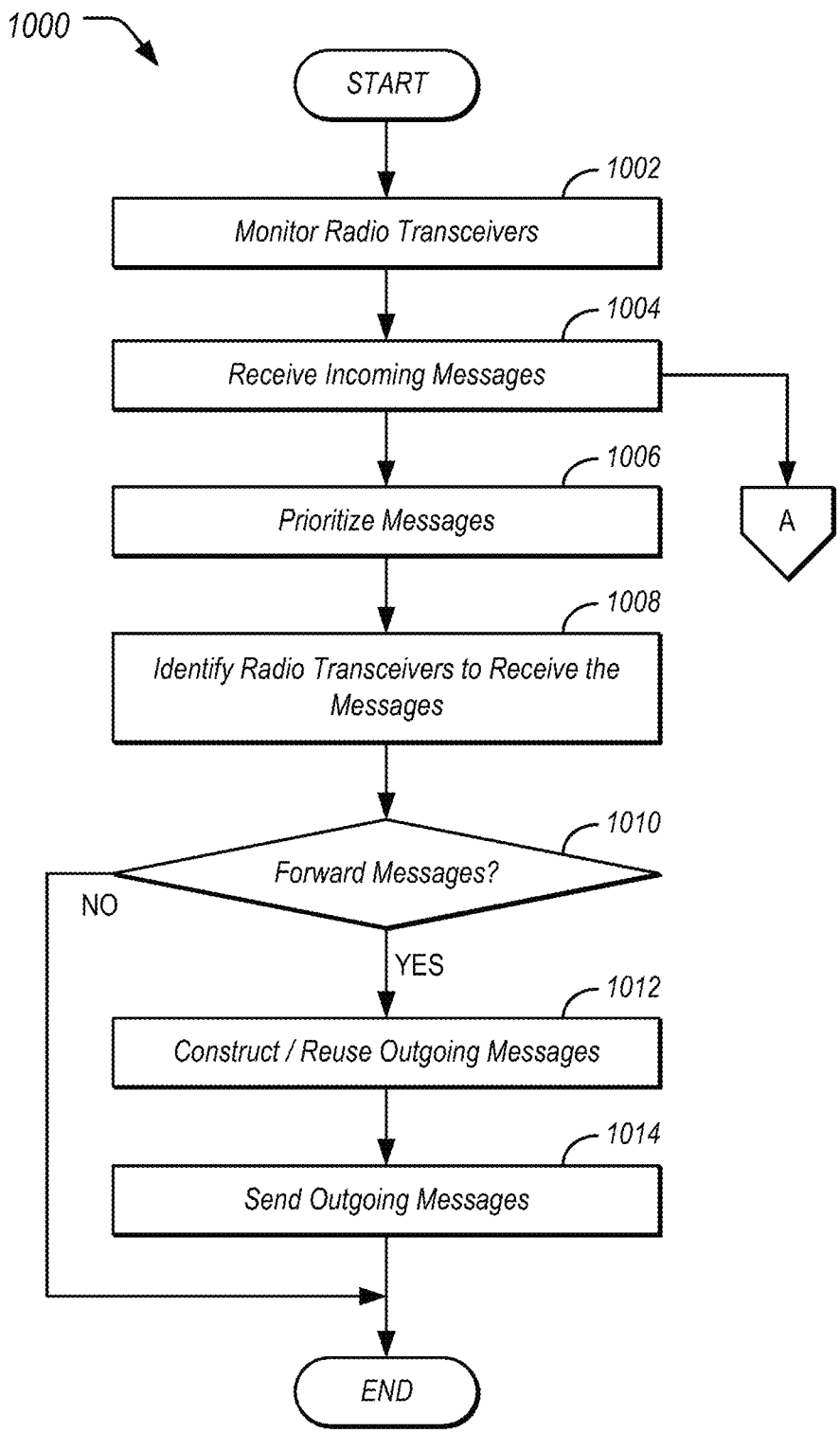
FIG. 10 illustrates an example process for the translation of messages among radio interfaces available to the OBU.

FIG. 10 illustrates an example process 1000 for the translation of messages among radio transceivers 108 available to the OBU 104. In an example, the process 1000 may be performed by the processor 112 of the bridge 110 of the OBU 104 of the vehicle 102 in the context of the system 100.

At operation 1002, the bridge 110 monitors radio transmissions. In an example, the congestion manager 116 monitors transmissions from each of the radio transceivers 108. The congestion manager 116 may do so to identify whether there are message recipients on each of the available protocols supported by the radio transceivers 108. The congestion manager 116 may also do so to direct a radio transceiver 108 that is congested to perform operations to mitigate the congestion.

At operation 1004, the bridge 110 receives an incoming message 202. In an example, the incoming message 202 may be received to one of the radio transceivers 108. This incoming message 202 may be directed to the processor 112 of the bridge 110 for analysis. The bridge 110 prioritizes the incoming message 202 at operation 1006. In an example, the priority manager 118 determines whether other incoming message 202 were received, and whether the priority of the current incoming message 202 is greater or lesser than that of the other incoming messages 202, if any. The incoming message 202 may further be utilized with respect to the vehicle 102 being in motion, as discussed below with respect to the process 1100.

At operation 1008, the bridge 110 identifies radio transceivers to receive the message. In an example, the bridge 110 may determine, based on the monitoring of the radio transmissions at 1004, that there are possible message recipients on one or more of the protocols supported by the radio transmissions at 1002. For instance, the bridge 110 may identify recent transmissions on certain of the protocols but not on other of the protocols. At operation 1010, the bridge 110 determines whether to forward the message. If other protocols are identified at operation 1008, control passes to operation 1012. Otherwise, the process ends.

At operation 1012, the bridge 110 constructs an outgoing message 204. In an example, the bridge 110 utilizes the translator 122 to create packets or other formats of message that include the information in conformance with the requirements of the protocol being translated to. In another example, for similar protocols, the bridge 110 may reuse the incoming message 202 as a base for the outgoing message 204. The bridge 110 sends the outgoing message at operation 1014. In an example, the bridge 110 directs the radio transceiver 108 corresponding to the output protocol to send the outgoing message 204. After operation 1014, the process 1000 ends.

Figure 11:
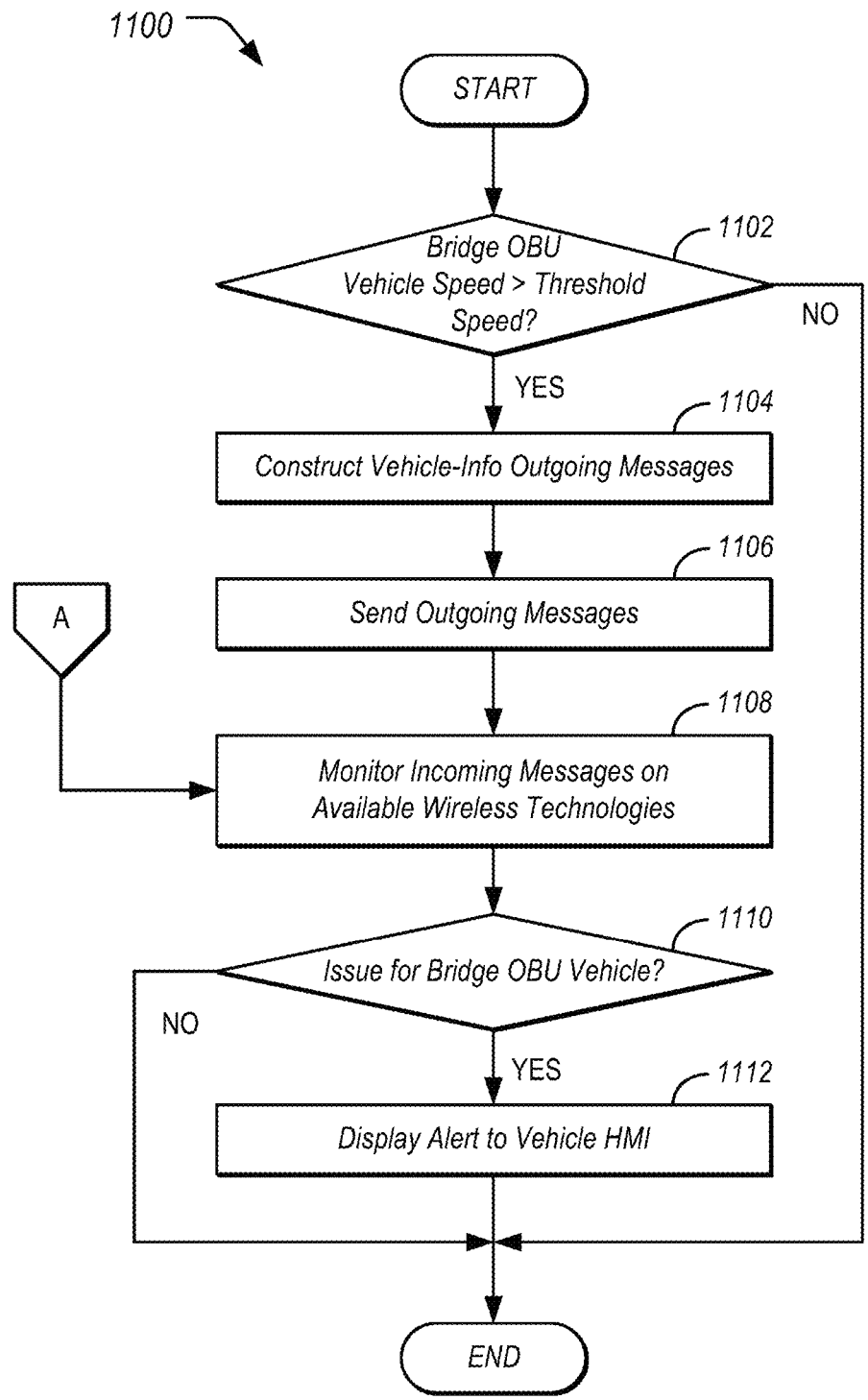
FIG. 11 illustrates an example process for the sending and receiving of messages among radio interfaces available to the OBU when the vehicle is in motion.

FIG. 11 illustrates an example process 1100 for the sending and receiving of messages among radio transceivers 108 available to the OBU 104 when the vehicle 102 is in motion. In an example, as with the process 1000, the process 1100 may be performed by the processor 112 of the bridge 110 of the OBU 104 of the vehicle 102 in the context of the system 100.

At operation 1102, the bridge 110 determines whether the vehicle 102 including the bridge 110 is traveling at least a threshold speed. In an example, the bridging behavior of the vehicle 102 may be affected based on whether the vehicle 102 is a traffic participant in moving traffic, or whether the vehicle 102 is stationary (or nearly stationary), such as when the vehicle 102 is attempting to broadcast information related to an obstacle area 604. In many examples, the threshold speed is zero or nearly zero. However, in other examples the threshold speed may be somewhat higher, e.g., five miles per hour, twenty-five miles per hour, if for example, the bridging vehicle 102 is following or otherwise making others aware of a slowly-moving traffic participant. If the vehicle 102 is traveling at least at the threshold speed, control passes to operation 1104. Otherwise, the process 1140 ends.

At operation 1104, the bridge 110 constructs an outgoing message 204 related to the movement of the vehicle 102. In an example, the message 204 may include BSM information for the vehicle 102 as specified by SAE-J2735. This outgoing message 204 may accordingly provide information about the vehicle 102 to other traffic participants. The bridge 110 sends the outgoing message 204 at operation 1106.

At operation 1108, and similar to as indicated at operations 1002 and 1004 of the process 1000, the vehicle 102 monitors for incoming messages 206. In an example, the incoming messages 202 may be received to one or more of the radio transceivers 108. The incoming messages 202 may be directed to the processor 112 of the bridge 110 for analysis. Moreover, messages 206 may still be monitored even if the vehicle 102 is stationary, as indicated by the reference from operation 1004 of the process 1000. This may be done to allow for alerting even in instances where the vehicle 102 is not moving.

At operation 1110, the bridge 110 determines whether the incoming messages 202 signal an issue that should alert the vehicle 102. For instance, the incoming messages 202 may indicate an upcoming obstacle area 604 (e.g., a construction zone, an accident, adjacency to lawn mowing, snow plow ahead, etc.) in proximity to the vehicle 102. At operation 1112, the bridge 110 causes an alert to be displayed to the vehicle HMI 134. After operation 1112, the process 1100 ends.

While the processes 1000 and 1100 are described in a linear manner, it should be noted that the processes may be performed continuously, or in a loop. For example, the process 1000 may be performed repeatedly, each time responsive to the receipt of messages such as noted at operation 1002. As another example, the operations 1104 and 1106 of the process 1100 may independently loop or otherwise be performed periodically, such as every 100-200 milliseconds.

In sum, by performing smart bridging of various wireless protocols not originally designed to be interoperable, additional ITS applications may be performed that might otherwise not be feasible. In particular, efficient methods and apparatus to bridge ITS networks supported by distinct wireless technologies may be performed by the improved OBU 104, which may be used to leverage input from various protocols and technologies to enhance ITS applications.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An on-board unit of a vehicle, comprising:
   a first transceiver configured to communicate using a first vehicle-to-everything protocol;
   a second transceiver configured to communicate using a second vehicle-to-everything protocol, the first vehicle-to-everything protocol and the second vehicle-to-everything protocol being incompatible with one another; and
   a processor programmed to
      monitor transmissions received from the first and second transceivers,
      receive an incoming message sent to the processor from the first transceiver, the incoming message being designated for distribution to roadway participants,
      identify based on the monitored transmissions whether the second transceiver is in communication with devices of roadway participants available to receive outgoing messages, and if so, construct an outgoing message based on the incoming message and send the outgoing message via the second transceiver and if not refrain from sending the outgoing message via the second transceiver, and
      monitor vehicle network bus traffic to identify a current speed of the vehicle, and responsive to the vehicle moving at least a threshold speed indicative of the vehicle being a traffic participant in moving traffic, construct and send vehicle-information outgoing messages including roadway observations of the vehicle using the first transceiver and the second transceiver, the vehicle-information outgoing messages being designated for distribution to the roadway participants.

2. The on-board unit of claim 1, wherein the processor is further programmed to:
   responsive to receipt of vehicle sensor data indicative of an obstacle area in proximity to the vehicle, indicate the obstacle area in the vehicle-information outgoing messages and prioritize sending the vehicle-information outgoing messages as compared to other messages.

3. The on-board unit of claim 1, wherein the incoming message is received from a mobile device of a roadway participant, and the processor is further programmed to:
responsive to receipt of the incoming message to the first transceiver, identify a threat level of the roadway participant to other of the roadway participants according to a measure of the roadway participant from a roadway; and
prioritize sending the outgoing message as compared to other messages according to the threat level.

4. The on-board unit of claim 1, wherein the measure is one or more of a distance of the roadway participant from the roadway, a speed of the roadway participant, a direction of the roadway participant, a location of the roadway participant, or roadway dynamics of the roadway.

5. The on-board unit of claim 1, wherein the first vehicle-to-everything protocol is Cellular Vehicle-to-Everything (CV2X) and the second vehicle-to-everything protocol is Dedicated Short Range Communications (DSRC).

6. The on-board unit of claim 1, wherein the first vehicle-to-everything protocol including communication via a BLUETOOTH wireless connection.

7. The on-board unit of claim 1, wherein the processor is further programmed to:
receive a second incoming message from the second transceiver, concurrent to reception of the incoming message from the first transceiver;
construct a second outgoing message based on the second incoming message; and
send the second outgoing message via the first transceiver.

8. A method for a vehicle including an on-board unit having a bridge, comprising:
monitoring in-vehicle bus traffic to identify a current speed of the vehicle;
monitoring wireless message traffic external to the vehicle on a plurality of vehicle communication protocols using a plurality of transceivers;
responsive to the current speed being at least a threshold speed indicative of the vehicle being a traffic participant in moving traffic, constructing and sending vehicle-information outgoing messages including roadway observations of the vehicle, the sending using a first protocol of the plurality of vehicle communication protocols and a second protocol of the plurality of vehicle communication protocols, the vehicle-information outgoing messages being designated for distribution to roadway participants; and
regardless of the current speed, receiving incoming messages from roadway users on a first of the plurality of vehicle communication protocols and interworking and sending outgoing messages to the roadway users on a second of the plurality of vehicle communication protocols.

9. The method of claim 8, further comprising:
responsive to receipt of vehicle sensor data indicative of an obstacle area in proximity to the vehicle, indicate the obstacle area in the vehicle-information outgoing messages and prioritize sending the vehicle-information outgoing messages as compared to other messages.

10. The method of claim 8, further comprising:
responsive to receipt of a first incoming message indicating a status of a first roadway participant via the first protocol, identifying a priority of providing information to other roadway participants about the first roadway participant according to the status;
receiving a second incoming message via the second protocol; and
prioritizing sending a first outgoing message including information indicating the status of the first roadway participant over other messages affiliated with lower priority statuses at least until the status of the first roadway participant is changed to a lower priority status.

11. The method of claim 8, wherein the first protocol is one of a set of protocols including: Cellular Vehicle-to-Everything (CV2X), Dedicated Short Range Communications (DSRC), Wi-Fi, BLUETOOTH, or Long Range Low Power Wide Area Networks (LoRaWAN).

12. The method of claim 11, wherein the second protocol is a different one of the set of protocols.

13. The method of claim 12, further comprising:
receiving a second incoming message via the second protocol, concurrent to reception of a first incoming message via the first protocol;
constructing a second outgoing message based on the second incoming message; and
sending the second outgoing message via the first protocol.

14. A non-transitory computer readable medium comprising instructions that, when executed by a processor of an on-board unit, cause the on-board unit to:
monitor in-vehicle bus traffic to identify a current speed of the vehicle;
monitor wireless message traffic external to the vehicle on a plurality of vehicle communication protocols using a plurality of transceivers;
responsive to the current speed being at least a threshold speed indicative of the vehicle being a traffic participant in moving traffic, construct and send vehicle-information outgoing messages including roadway observations of the vehicle, the send using a first protocol of the plurality of vehicle communication protocols and a second protocol of the plurality of vehicle communication protocols, the vehicle-information outgoing messages being designated for distribution to roadway participants; and
regardless of the current speed, receive incoming messages from roadway users on a first of the plurality of vehicle communication protocols and interwork and send outgoing messages to the roadway users on a second of the plurality of vehicle communication protocols.

15. The medium of claim 14, further comprising instructions that, when executed by the processor of the on-board unit, cause the on-board unit to:
responsive to receipt of vehicle sensor data indicative of an obstacle area in proximity to the vehicle, indicate the obstacle area in the vehicle-information outgoing messages and prioritize sending the vehicle-information outgoing messages as compared to other messages.

16. The medium of claim 14, further comprising instructions that, when executed by the processor of the on-board unit, cause the on-board unit to:
responsive to receipt of a first incoming message indicating a status of a first roadway participant via the first protocol, identify a priority of providing information to other roadway participants about the first roadway participant according to the status;
receive a second incoming message via the second protocol; and
prioritize sending a first outgoing message including information indicating the status of the first roadway participant over other messages affiliated with lower priority statuses at least until the status of the first roadway participant is changed to a lower priority status.

17. The medium of claim 14, wherein the first protocol is one of a set of protocols including: Cellular Vehicle-to-Everything (CV2X), Dedicated Short Range Communications (DSRC), Wi-Fi, BLUETOOTH, or Long Range Low Power Wide Area Networks (LoRaWAN).

18. The medium of claim 17, wherein the second protocol is a different one of the set of protocols.

19. The medium of claim 18, further comprising instructions that, when executed by the processor of the on-board unit, cause the on-board unit to:
   receive a second incoming message via the second protocol, concurrent to reception of a first incoming message via the first protocol;
   construct a second outgoing message based on the second incoming message; and
   send the second outgoing message via the first protocol.

* * * * *